H. E. FUDGE.
PLOW.
APPLICATION FILED MAY 8, 1917.
1,315,923.
Patented Sept. 9, 1919.
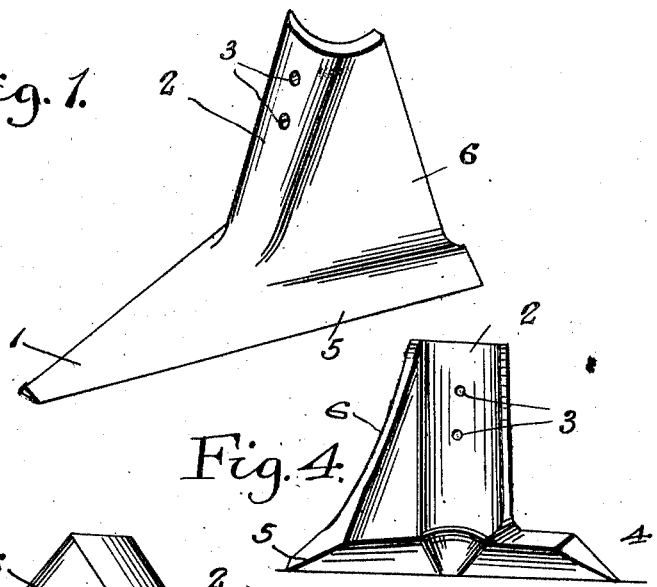
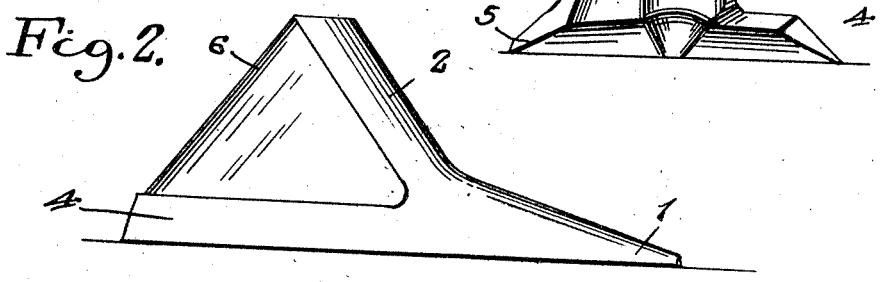
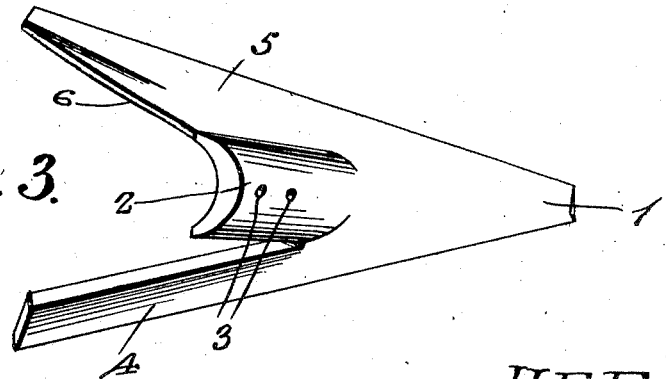
Inventor
H. E. Fudge.

UNITED STATES PATENT OFFICE.

HENRY E. FUDGE, OF PORT LAVACA, TEXAS.

PLOW.

1,315,923. Specification of Letters Patent. Patented Sept. 9, 1919.

Application filed May 8, 1917. Serial No. 167,287.

*To all whom it may concern:*

Be it known that I, HENRY EDWIN FUDGE, a citizen of the United States, residing at Port Lavaca, in the county of Calhoun and State of Texas, have invented certain new and useful Improvements in Plows; and I do hereby declare the following to be a full, clear, and exact description of the invention, such as will enable others skilled in the art to which it appertains to make and use the same.

This invention relates to a plow shovel or bottom, and the primary object of the invention is to provide a plow which will embody the advantageous features of an ordinary cultivating shovel plow and a sweep, so that when cultivating small or young plants, the sweep blade of the plow may be positioned toward the plants for cultivating them without covering them with dirt while the shovel side of the plow will thoroughly stir the ground outwardly of the row of plants and when it is desired to ridge the ground along the rows of plants, the turning or shovel side of the plow may be positioned toward the row of plants so that it will throw the dirt thereon.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a perspective view of the improved plow;

Fig. 2 is a side elevation of the plow looking from the sweep side of the same;

Fig. 3 is a top plan view of the plow; and

Fig. 4 is a rear elevation of the plow.

Referring more particularly to the drawings, 1 designates the point of the plow which is positioned substantially in a horizontal plane, having its upper surface curved or arched transversely, as is customary in the formation of cultivating a sweep. The point 1 of the plow has an upwardly extending shank 2 formed integrally therewith, which shank is provided with the usual openings 3 which receive the bolts that attach the plow to a cultivator standard. The sweep blade 4 projects outwardly and rearwardly from one side of the point 1 of the plow, and the opposite side 5 of the plow projects at the same angle from the point as the sweep blade, being similar to the sweep blade in construction, in every respect with the exception of a web 6 which is formed integrally with the inclined portion 5 and with the shank 3. The portion 5 is inclined the same as the sweep blade 4, as will be clearly shown in Fig. 4 of the drawings, and the web 6 is concavely curved from the upper edge of the portion 5 diagonally of the web so that it will turn or throw the dirt similar to the action of an ordinary cultivating shovel when the same is positioned at an angle with respect to the row of plants being cultivated. When it is desired to cultivate young plants, and to avoid the covering of the plants, the sweep blade 4 is positioned toward the row of plants so that the dirt stirred, will pass over the sweep blade and lie flat, along the rows, while the dirt in the middles will be efficiently stirred and turned by the side 5 and the web 6 of the plow. When two or more of the plows are used one behind the other, the sweep blade of the rear plows will fill the furrow formed by the web and sides 5 of the plow directly in front thereof, and keeping the field level and eliminating the formation of a furrow which would dry out. When the plows are reversed, so that the side 5 and web 6 will face the row, the dirt will be ridged along the rows of plants.

In reducing the invention to practice, certain minor features of construction, combination and arrangement of parts may necessitate alterations to which the patentee is entitled, provided such alterations are comprehended within the scope of what is claimed.

What is claimed is:—

A plow having a rearwardly flaring soil entering point arched transversely and provided with side arms extending rearwardly in diverging relation and having their sides converging upwardly, the lower edges of the arms and point extending horizontally, a shank extending upwardly and rearwardly from the rear end of said soil entering point and curved transversely, and a concave web extending upwardly from one of the side arms and merging into one side of said shank.

In testimony whereof I affix my signature in presence of two witnesses.

HENRY E. FUDGE.

Witnesses:
G. F. BASTIAN,
AMOS JORDAN, Jr.

Copies of this patent may be obtained for five cents each, by addressing the "Commissioner of Patents, Washington, D. C."